United States Patent
Wei

(10) Patent No.: US 11,915,364 B2
(45) Date of Patent: *Feb. 27, 2024

(54) ILLUMINATION RENDERING METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Zhi Xiao Wei, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,385

(22) Filed: Feb. 3, 2023

(65) Prior Publication Data

US 2023/0186553 A1    Jun. 15, 2023

Related U.S. Application Data

(63) Continuation of application No. 17/365,498, filed on Jul. 1, 2021, now Pat. No. 11,600,040, which is a
(Continued)

(30) Foreign Application Priority Data

May 17, 2019 (CN) .......................... 201910413385.7

(51) Int. Cl.
G06T 15/50 (2011.01)
G06T 15/04 (2011.01)
G06T 15/20 (2011.01)

(52) U.S. Cl.
CPC ............ G06T 15/506 (2013.01); G06T 15/04 (2013.01); G06T 15/20 (2013.01)

(58) Field of Classification Search
None
See application file for complete search history.

(56) References Cited

U.S. PATENT DOCUMENTS

| 9,451,141 | B2* | 9/2016 | Kadambi | ............. H04N 5/2226 |
| 2015/0279113 | A1* | 10/2015 | Knorr | .................. G06T 19/006 |
| | | | | 345/633 |

(Continued)

FOREIGN PATENT DOCUMENTS

| CN | 103021020 A | 4/2013 |
| CN | 103606182 A | 2/2014 |

(Continued)

OTHER PUBLICATIONS

Damez et al., "State of the Art in Global Illumination for Interactive Applications and High-Quality Animations," Computer Graphics *forum*, vol. 21 (2003), No. 4, pp. 55-77 (23 pp).

(Continued)

*Primary Examiner* — Nurun Flora
(74) *Attorney, Agent, or Firm* — Crowell & Moring LLP

(57) ABSTRACT

An illumination rendering method and apparatus includes obtaining a first picture at a target viewing angle from a virtual three-dimensional (3D) scene. The first picture includes a virtual object to be subject to illumination rendering in the virtual 3D scene at the target viewing angle. A target virtual light source point set is determined that performs illumination rendering on the virtual object in the first picture. Illumination rendering is performed on the virtual object in the first picture by using the target virtual light source point set. This illumination rendering improves efficiency in rendering on the virtual object in the virtual 3D scene.

20 Claims, 6 Drawing Sheets

Related U.S. Application Data continuation of application No. PCT/CN2020/088629, filed on May 6, 2020.

(56) References Cited

U.S. PATENT DOCUMENTS

| | | | | |
|---|---|---|---|---|
| 2015/0325041 | A1* | 11/2015 | Ha | G06T 19/006 345/426 |
| 2017/0372508 | A1 | 12/2017 | Schoeneman | |
| 2018/0122090 | A1* | 5/2018 | Ha | G06T 15/50 |

FOREIGN PATENT DOCUMENTS

| CN | 104008563 A | 8/2014 |
|---|---|---|
| CN | 106504315 A | 3/2017 |
| CN | 104966312 B | 7/2017 |
| CN | 106980381 A | 7/2017 |
| CN | 107204029 A | 9/2017 |
| CN | 108965535 A | 12/2018 |
| CN | 109118571 A | 1/2019 |
| CN | 109166170 A | 1/2019 |
| CN | 109364481 A | 2/2019 |
| CN | 110288692 A | 9/2019 |

OTHER PUBLICATIONS

Extended European Search Report dated Jun. 20, 2022 for EP Application No. EP 20810793.8 (19 pages).
International Search Report and Written Opinion received for Application No. PCT/CN2020/088629 dated Aug. 12, 2020 (English and Chinese languages), (9 pages).
Laine et al., "Incremental Instant Radiosity for Real-Time Indirect Illumination," Eurographics Symposium on Rendering, May 23, 2007 (10 pp).
Scherzer et al., "Temporal Coherence Methods in Real-Time Rendering,"Computer Graphics *forum*, Journal of the European Association for Computer Graphics, Wiley-Blackwell, Oxford, vol. 31 (2012), No. 8, pp. 2378-2408 (31 pp).
Search Report from the China State Intellectual Property Office for Application No. CN 201910413385.7 dated Aug. 12, 2020 (only Chinese language), (12 pages).

* cited by examiner

ILLUMINATION RENDERING METHOD AND APPARATUS, STORAGE MEDIUM, AND ELECTRONIC DEVICE

CROSS-REFERENCE TO RELATED APPLICATIONS

This application is a continuation of U.S. patent application Ser. No. 17/365,498, entitled "ILLUMINATION RENDERING METHOD AND APPARATUS, STORAGE MEDIUM, AND ELECTRONIC DEVICE", filed on Jul. 1, 2021, pending, which claims priority to PCT/CN2020/088629, filed May 6, 2020, entitled "ILLUMINATION RENDERING METHOD AND APPARATUS, STORAGE MEDIUM, AND ELECTRONIC DEVICE", which claims priority to Chinese Patent Application No. 201910413385.7, entitled "ILLUMINATION RENDERING METHOD AND APPARATUS, STORAGE MEDIUM, AND ELECTRONIC DEVICE", filed with the China National Intellectual Property Administration on May 17, 2019, each of which are incorporated herein by reference in their entirety.

FIELD OF THE TECHNOLOGY

This application relates to the field of computers, and specifically, to an illumination rendering technology.

BACKGROUND OF THE DISCLOSURE

In the related art, before a virtual object in a virtual three-dimensional (3D) scene is displayed, real-time global illumination rendering generally needs to be performed on the virtual object in the virtual 3D scene, and the rendered object in the virtual scene is then displayed.

However, because complex steps that need to be performed on real-time rendering on the virtual object in the 3D scene consume a large amount of resources, the illumination rendering provided in the related art has a lower rendering efficiency.

For the foregoing problem, no effective solution has been proposed yet.

SUMMARY

Embodiments of this application provide an illumination rendering method and apparatus, a storage medium, and an electronic device, to resolve at least the technical problem of a low efficiency in global illumination rendering on a virtual object in a virtual three-dimensional (3D) scene in the related art.

According to one example of the embodiments of this application, an illumination rendering method is provided, including: obtaining a first picture at a target viewing angle from a virtual 3D scene, the first picture including a virtual object to be subject to illumination rendering in the virtual 3D scene at the target viewing angle; determining a target virtual light source point set that performs illumination rendering on the virtual object in the first picture; and performing illumination rendering on the virtual object in the first picture by using the target virtual light source point set.

According to another example of the embodiments of this application, an illumination rendering apparatus is further provided, including: an obtaining unit, configured to obtain a first picture at a target viewing angle from a virtual 3D scene, the first picture including a virtual object to be subject to illumination rendering in the virtual 3D scene at the target viewing angle; a determining unit, configured to determine a target virtual light source point set that performs illumination rendering on the virtual object in the first picture; and a rendering unit, configured to perform illumination rendering on the virtual object in the first picture by using the target virtual light source point set.

In one example, the determining unit includes: a first determining module, configured to determine an original virtual light source point set of each sub-picture in the first picture, the first picture including a plurality of sub-pictures; and a first merging module, configured to merge the original virtual light source point sets of all the sub-pictures to obtain the target virtual light source point set, the target virtual light source point set including no repeated light source points.

In one example, the first determining module includes: a first determining submodule, configured to determine, for each sub-picture in the first picture, an associated pixel of each pixel in the sub-picture, to obtain an associated pixel set of the sub-picture; and a second determining submodule, configured to determine first M pixels that appear most frequently in the associated pixel set as the original virtual light source point set of the sub-picture, M being an integer greater than zero.

In one example, the first determining submodule is further configured to perform the following steps: separately determining each pixel in the sub-picture as a first pixel, and performing the following operations: separately determining, in each of four directions, namely, up, down, left, and right, of the first pixel, a pixel that is closest to the first pixel and has a depth value greater than a depth value of the first pixel as a second pixel, and determining a second pixel with a minimum depth value as an associated pixel of the first pixel; and merging the associated pixels of all the pixels in the sub-picture into the associated pixel set of the sub-picture, the associated pixel set including repeated pixels.

In one example, the determining unit includes: a second determining module, configured to determine an original virtual light source point set of each sub-picture in the first picture when a difference between a time at which the first picture is obtained and a time at which a $(J-1)^{th}$ processed picture is obtained is greater than or equal to a first threshold, the first picture including a plurality of sub-pictures, the first picture being a $J^{th}$ picture in a picture set, and J being an integer greater than 1; and a second merging module, configured to merge the original virtual light source point sets of all the sub-pictures to obtain the target virtual light source point set of the first picture, the target virtual light source point set including no repeated light source points.

In one example, the determining unit further includes: a third determining module, configured to use a target virtual light source point set of the $(J-1)^{th}$ processed picture as the target virtual light source point set of the first picture when the difference between the time at which the first picture is obtained and the time at which the $(J-1)^{th}$ processed picture is obtained is less than the first threshold, the first picture being the $J^{th}$ picture in the picture set, and J being an integer greater than 1.

In one example, the rendering unit includes: a first obtaining module, configured to obtain a result of illuminating each pixel in the first picture by using the target virtual light source point set, to obtain an illumination map of the first picture, the illumination map recording an illumination value of each pixel in the first picture; and a superimposing module, configured to superimpose the illumination map onto a color map of the first picture, to obtain a rendered first picture.

In one example, the obtaining module includes: an execution submodule, configured to use each pixel in the first picture as a third pixel, and perform the following operations until an illumination result for each pixel in the first picture is determined: determining a first illumination value of each virtual light source point in the target virtual light source point set on the third pixel and adding the first illumination values of all the virtual light source points in the target virtual light source point set on the third pixel, to obtain the illumination result.

In one example, the rendering unit is configured to: obtain a target virtual light source point set of each processed picture before the first picture in a picture set; determine a second virtual light source point set of the first picture according to the target virtual light source point set of each picture in the picture set, the first picture being a last picture in the picture set; replace N pixels in the second virtual light source point set of the first picture with N pixels in a first virtual light source point set of a processed picture in a previous frame of the first picture, and determine the second virtual light source point set that has undergone replacement as a first virtual light source point set of the first picture; and perform illumination rendering on the virtual object in the first picture by using the first virtual light source point set of the first picture.

In one example, the rendering unit further includes: a second obtaining module, configured to obtain a weight value predetermined for each processed picture in the picture set; a third obtaining module, configured to obtain, for each pixel in the target virtual light source point set of the first picture, a weight of a processed picture of which the target virtual light source point set includes the pixel; a fourth obtaining module, configured to obtain a sum of weights, to obtain a weight sum of each pixel in the first picture; and a fourth determining module, configured to use first K pixels with largest weight sums in the first picture as the second virtual light source point set of the first picture, K being an integer greater than zero.

According to still another example of the embodiments of this application, a storage medium is further provided, the storage medium storing a computer program, the computer program being configured to, when run, perform the foregoing illumination rendering method.

According to still another example of the embodiments of this application, an electronic device is further provided, including a memory, a processor, and a computer program that is stored in the memory and executable on the processor, the processor performing the foregoing illumination rendering method by using the computer program.

In this embodiment of this application, adopted is the method, including: obtaining a first picture at a target viewing angle from a virtual 3D scene, the first picture including a virtual object to be subject to illumination rendering in the virtual 3D scene at the target viewing angle; determining a target virtual light source point set that performs illumination rendering on the virtual object in the first picture, the target virtual light source point set being main light source points that render the virtual object in the virtual 3D scene; and performing illumination rendering on the virtual object in the first picture by using the target virtual light source point set. In the foregoing method, the first picture at the target viewing angle is directly obtained from the virtual 3D scene, and illumination rendering is performed on the first picture by using the target virtual light source point set of the first picture. Therefore, it may be unnecessary to render the virtual object in the virtual 3D scene and main light source points that render the virtual object can be obtained rapidly, thereby improving the efficiency of rendering a virtual object in a virtual 3D scene, and further resolving the technical problem of the low efficiency in global illumination rendering on the virtual object in the virtual 3D scene in the related art.

BRIEF DESCRIPTION OF THE DRAWINGS

The accompanying drawings described herein are used for providing a further understanding of this application, and form part of this application. Example embodiments of this application and descriptions thereof are used for interpreting this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts fall within the protection scope of this application.

In this specification, the claims, and the accompanying drawings of this application, the terms "first", "second", and so on are intended to distinguish similar objects but do not necessarily indicate a specific order or sequence. The data used in this way may be interchanged in an appropriate case, so that the embodiments of this application described herein can be implemented in a sequence other than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to one example of the embodiments of this application, an illumination rendering method is provided. In some embodiments, the illumination rendering method is applicable to, but not limited to, an environment shown in FIG. 1.

Figure 1:
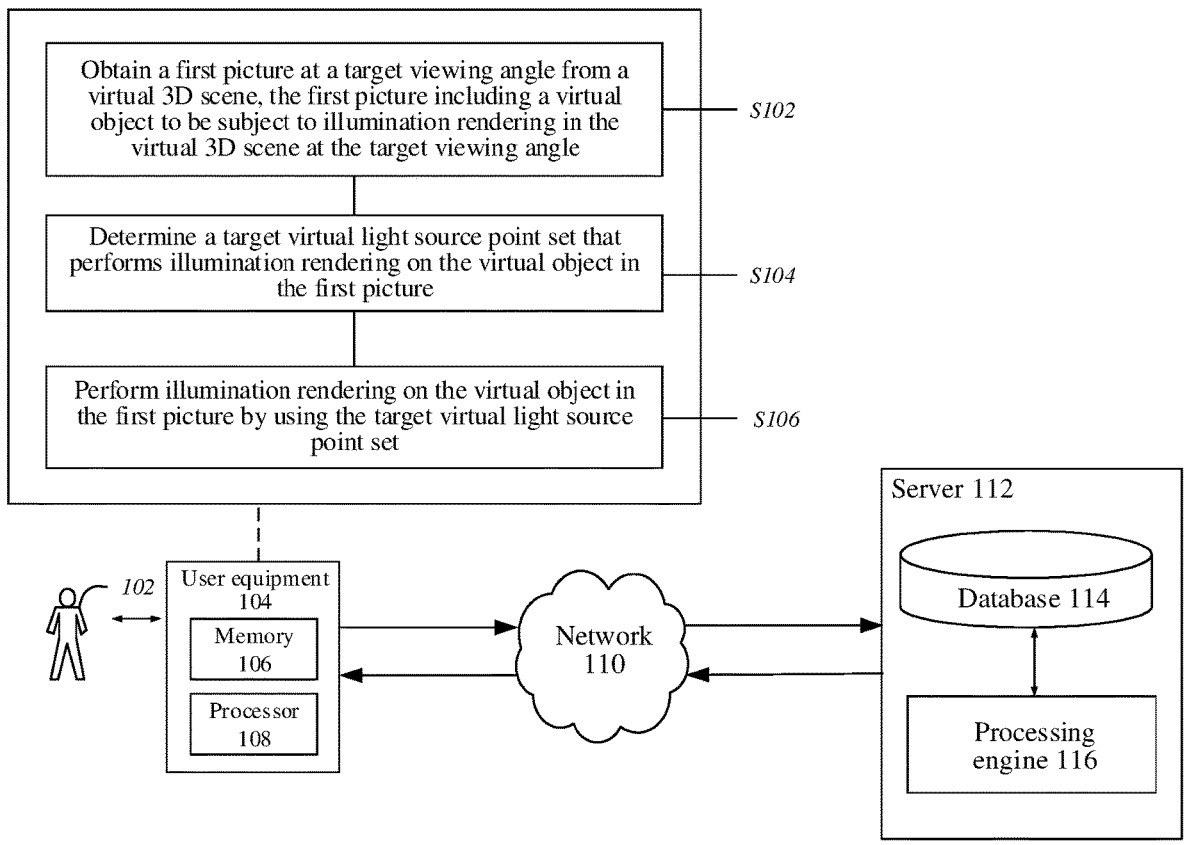
FIG. 1 is a schematic diagram of an application environment of one illumination rendering method according to an embodiment of this application.

In FIG. 1, a user 102 may perform human-computer interaction with user equipment 104. The user equipment 104 includes a memory 106 configured to store interaction data and a processor 108 configured to process interaction data. The user equipment 104 and a server 112 may exchange data with each other via a network 110. The server 112 includes a database 114 configured to store interaction data and a processing engine 116 configured to process interaction data. A virtual three-dimensional (3D) scene is run in the user equipment 104. The user equipment 104 performs, by using a method of obtaining a first picture at a target viewing angle, determining a target virtual light source point set of the first picture, and rendering a virtual object in the first picture by using the target virtual light source point set in step S102 to step S106, illumination rendering on the first picture instead of performing global illumination rendering on the virtual object in the virtual 3D scene, thereby improving the efficiency of illumination rendering on the virtual 3D scene.

In some embodiments, the foregoing illumination rendering method is applicable to, but not limited to, terminals that can perform calculation of data, for example, terminals such as a mobile phone, a tablet computer, a laptop computer, and a personal computer (PC). The network may include, but not limited to, a wireless network or a wired network. The wireless network includes: a wireless fidelity (Wi-Fi) network and other networks implementing wireless communication. The wired network may include, but not limited to, a wide area network, a metropolitan area network, and a local area network. The server may include, but not limited to, any hardware device that is capable of performing calculation.

Figure 2:
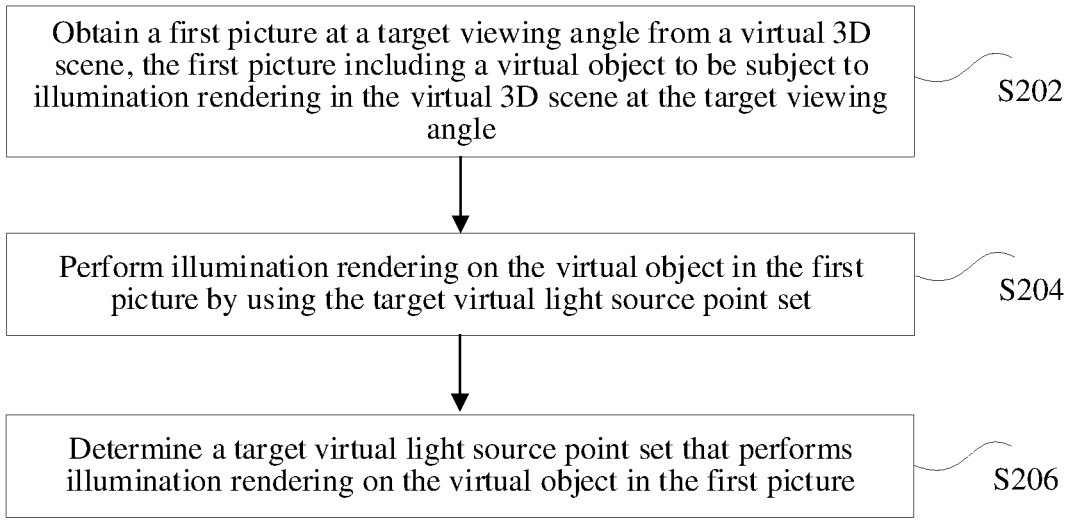
FIG. 2 is a schematic flowchart of one illumination rendering method according to an embodiment of this application.

In one implementation, as shown in FIG. 2, the foregoing illumination rendering method includes the following steps:

S202. Obtain a first picture at a target viewing angle from a virtual 3D scene, the first picture including a virtual object to be subject to illumination rendering in the virtual 3D scene at the current viewing angle.

S204. Determine a target virtual light source point set that performs illumination rendering on the virtual object in the first picture.

S206. Perform illumination rendering on the virtual object in the first picture by using the target virtual light source point set.

In some embodiments, the foregoing illumination rendering method is applicable to, but not limited to, a process of performing illumination rendering on the virtual 3D scene, for example, a process of performing illumination rendering on a virtual 3D scene in a game, performing illumination rendering on a virtual 3D scene in virtual training, or performing rendering on a virtual 3D scene in virtual shopping.

Description is made by using an example in which illumination rendering is performed on a virtual 3D scene in a game. During the game, the virtual 3D scene is run in the game. The virtual 3D scene includes a virtual object to be subject to global illumination rendering. In the related art, a real-time calculation generally needs to be performed based on illumination effect on the virtual object in the virtual 3D scene by a virtual light source in the virtual 3D scene, to obtain a calculation result, and global illumination rendering is performed on the virtual object. However, the foregoing method has a large calculation amount, and has a low efficiency in global illumination rendering on the virtual 3D scene. In this embodiment, the first picture at the target viewing angle is obtained from the virtual 3D scene, the target virtual light source point set that performs illumination rendering on the virtual object in the first picture is determined, and illumination rendering is performed on the virtual object in the first picture by using the target virtual light source point set, to perform illumination rendering on only the first picture instead of performing real-time rendering on the virtual 3D scene, thereby reducing the calculation amount during rendering, and improving the efficiency of rendering the virtual 3D scene.

In some embodiments, when the target virtual light source point set is determined, the first picture may be divided into a plurality of sub-pictures, an original virtual light source point set of each sub-picture is determined, and the original virtual light source point sets are merged, to obtain the target virtual light source point set including no repeated light source points.

Figure 3:
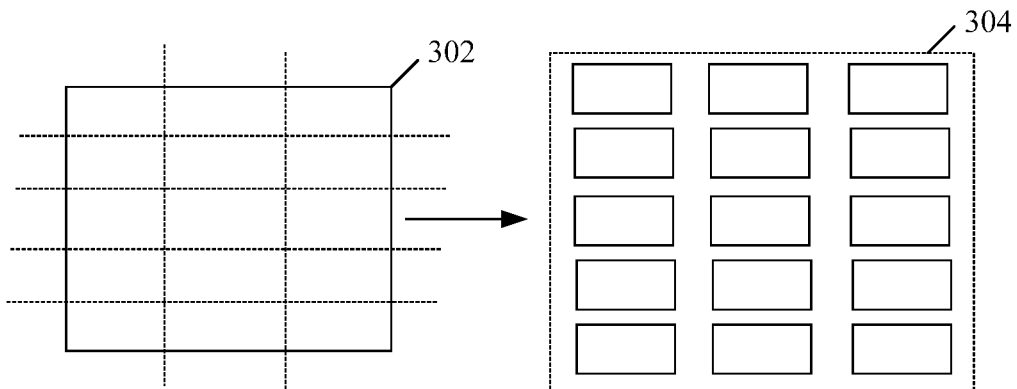
FIG. 3 is a schematic diagram of one illumination rendering method according to an embodiment of this application.

FIG. 3 is one schematic diagram of splitting a first picture. As shown in FIG. 3, the first picture 302 is divided into a plurality of sub-pictures 304. Each white rectangular box in FIG. 3 represents one sub-picture.

In some embodiments, when an original virtual light source point set of each sub-picture is determined, an associated pixel of each pixel in each sub-picture needs to be determined, and the original virtual light source point set is determined.

In this embodiment of this application, an associated pixel set of the sub-picture may be determined by using a plurality of methods. In a possible implementation, a manner of determining the associated pixel set of the sub-picture may be: separately determining each pixel in the sub-picture as a first pixel, and determining, for each first pixel in each of four directions, namely, up, down, left, and right, of the first pixel, a pixel that is closest to the first pixel and has a depth value greater than a depth value of the first pixel as a second pixel; and then determining a second pixel with a minimum depth value as an associated pixel of the first pixel, and merging the associated pixels of all the pixels in the sub-picture to obtain the associated pixel set of the sub-picture, the associated pixel set including repeated pixels.

Figure 4:
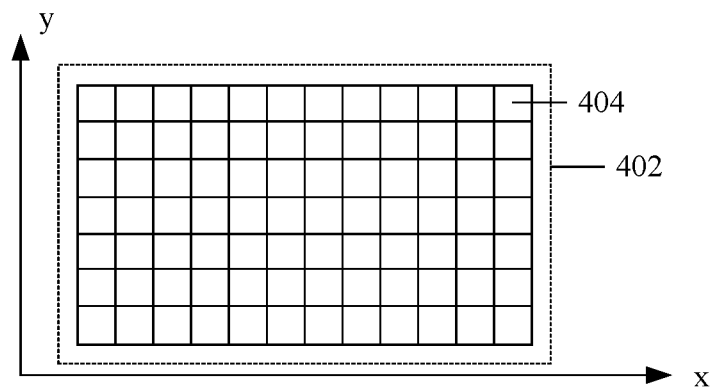
FIG. 4 is a schematic diagram of another optional illumination rendering method according to an embodiment of this application.
Figure 5:
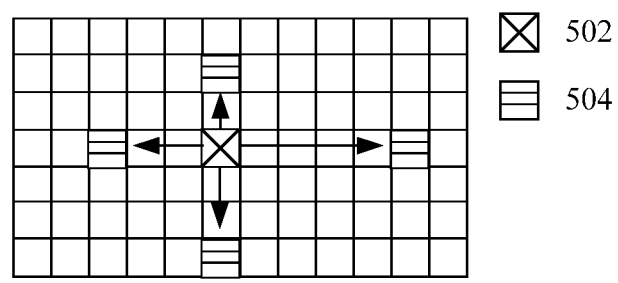
FIG. 5 is a schematic diagram of still another optional illumination rendering method according to an embodiment of this application.

A sub-picture is used as an example. As shown in FIG. 4, a sub-picture 402 is placed in a rectangular plane coordinate system, and each pixel 404 in the sub-picture corresponds to four directions, namely, a positive x direction, a positive y direction, a negative x direction, and a negative y direction. If the positive x direction is the right by default, and the positive y direction is the up by default, each pixel corresponds to the four directions, namely, up, down, left, and right. If each pixel in the sub-picture is determined as a first pixel, a pixel closest to the first pixel in each of the four directions, namely, up, down, left, and right, of the first pixel, for example, an adjacent pixel is traversed, and a depth value of the adjacent pixel of the first pixel is determined. If the depth value of the adjacent pixel is less than the depth value of the first pixel, traversal in this direction stops. If the depth value of the adjacent pixel is greater than the depth value of the first pixel, traversal in this direction continues until a pixel with a depth value being less than the depth value of the first pixel is traversed in each direction. FIG. 5 is a schematic diagram of traversing to second pixels 504 in the four directions after a first pixel 502 is traversed. A value needs to be predetermined during the traversal, and in each of the four directions, the traversal stops after a specified quantity of pixels is traversed even if no second pixel is traversed. If no second pixel is traversed, the first pixel is determined as the second pixel. After the second pixels are traversed, a second pixel with a minimum depth value is determined as an associated pixel of the first pixel.

In some embodiments, after associated pixels of all the pixels in a sub-picture are determined, the associated pixels of all the pixels are merged into an associated pixel set, the associated pixel set including repeated associated pixels. First M pixels that appear most frequently in the associated pixel set are determined as an original virtual light source point set of the sub-picture. After an original virtual light source point set of each sub-picture is obtained, the original virtual light source point sets of all the sub-pictures are merged into a light source point set including no repeated light source points, the merged light source point set is determined as the target virtual light source point set of the first picture, and illumination rendering is performed on the virtual object in the first picture by using the target virtual light source point set of the first picture.

In some embodiments, in this embodiment, target virtual light source points of the first picture are calculated once at a predetermined time interval. If the first picture is a $J^{th}$ picture in a picture set, and J is an integer greater than 1, a time at which a processed picture in a previous frame of the first picture (for example, a $(J-1)^{th}$ picture) is obtained and a time at which the first picture is obtained are determined. If a difference between the two times is less than a first threshold, a target virtual light source point set of the processed picture in the previous frame of the first picture is determined as the target virtual light source point set of the first picture, to reduce a calculation amount of a system.

If the difference between the two times is greater than or equal to the first threshold, an original virtual light source point set of each sub-picture in the first picture is determined, and the original virtual light source point sets of all the sub-pictures are merged, to obtain a target virtual light source point set including no repeated light source points.

In some embodiments, after the target virtual light source point set of the first picture is obtained through calculation, illumination rendering may be performed on the virtual object in the first picture by using the target virtual light source point set of the first picture. During rendering, for each pixel in the first picture, a result of illuminating the pixel by using the target virtual light source point set is calculated. After the result of illuminating each pixel in the first picture by using the target virtual light source point set is obtained through calculation, an illumination map recording an illumination value of each pixel is obtained. After the illumination map of the first picture is obtained, the illumination map is superimposed onto a color map of the first picture, to obtain a mixed picture. The mixed picture is a picture obtained after illumination rendering is performed on the first picture.

In some embodiments, when a result of illuminating a pixel by using the target virtual light source point set is calculated, each pixel in the first picture is used as a third pixel, and the following operations are performed until an illumination result for each pixel in the first picture is determined. The following operations, for example, may be: calculating a first illumination value of each virtual light source point in the target virtual light source point set on a pixel (for example, the third pixel), adding the first illumination values of all the virtual light source points in the target virtual light source point set on the third pixel, to obtain a sum of first illumination values of all the target virtual light source points in the target virtual light source point set on the pixels, and using the sum obtained through calculation as the result of illuminating the pixel by using the target virtual light source point set.

In some embodiments, in the foregoing method, illumination rendering is performed on the first picture by using the target virtual light source points in the target virtual light source point set. In another manner, the target virtual light source point set may be alternatively processed after the target virtual light source point set of the first picture is obtained, to obtain a first virtual light source point set, and the first picture is rendered by using the first virtual light source point set.

In some embodiments, the foregoing processing process is that: target virtual light source point sets of all the processed pictures before the first picture may be obtained after the target virtual light source point set of the first picture is obtained. For example, during rendering, each first picture and a plurality of rendered pictures before the first picture are determined as a picture set. A specific picture quantity of the picture set may be predetermined. The first picture is a last picture in the picture set. A target virtual light source point set of each picture in the picture set is determined by using the foregoing method. A weight value is predetermined for each picture in the picture set. Then, for each pixel in the target virtual light source point set of the first picture, the target virtual light source point sets of all the pictures in the picture set are traversed. If the pixel is located in a target virtual light source point set of a picture in the picture set, a weight of the picture is obtained. After all the target virtual light source point sets in the picture set are traversed, all obtained weights are added, to obtain the weight of the pixel in the target virtual light source point set of the first picture. A weight of each pixel in the first picture may be obtained by using the foregoing method. First k pixels with largest weight sums are determined as a second virtual light source point set of the first picture. N pixels in the second virtual light source point set of the first picture are replaced with N pixels in a first virtual light source point set of a processed picture in a previous frame of the first picture, and the second virtual light source point set that has undergone replacement is used as the first virtual light source point set of the first picture. The first picture is rendered by using the first virtual light source point set. The first picture rendered by using the method is more stable than a first picture rendered by directly using the target virtual light source point set, thereby avoiding flickering of pictures in a time series.

Figure 6:
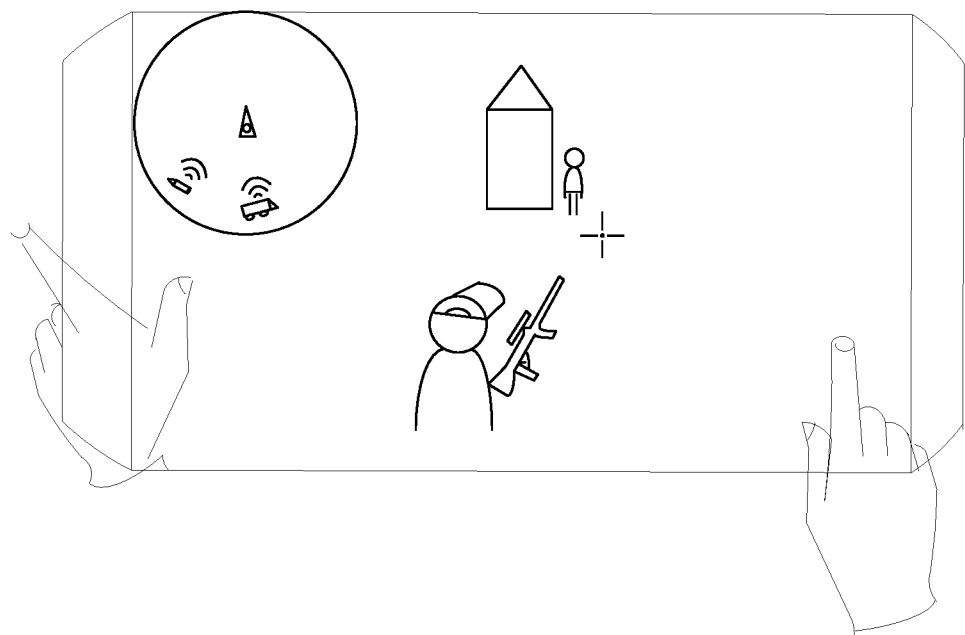
FIG. 6 is a schematic diagram of still another optional illumination rendering method according to an embodiment of this application.
Figure 7:
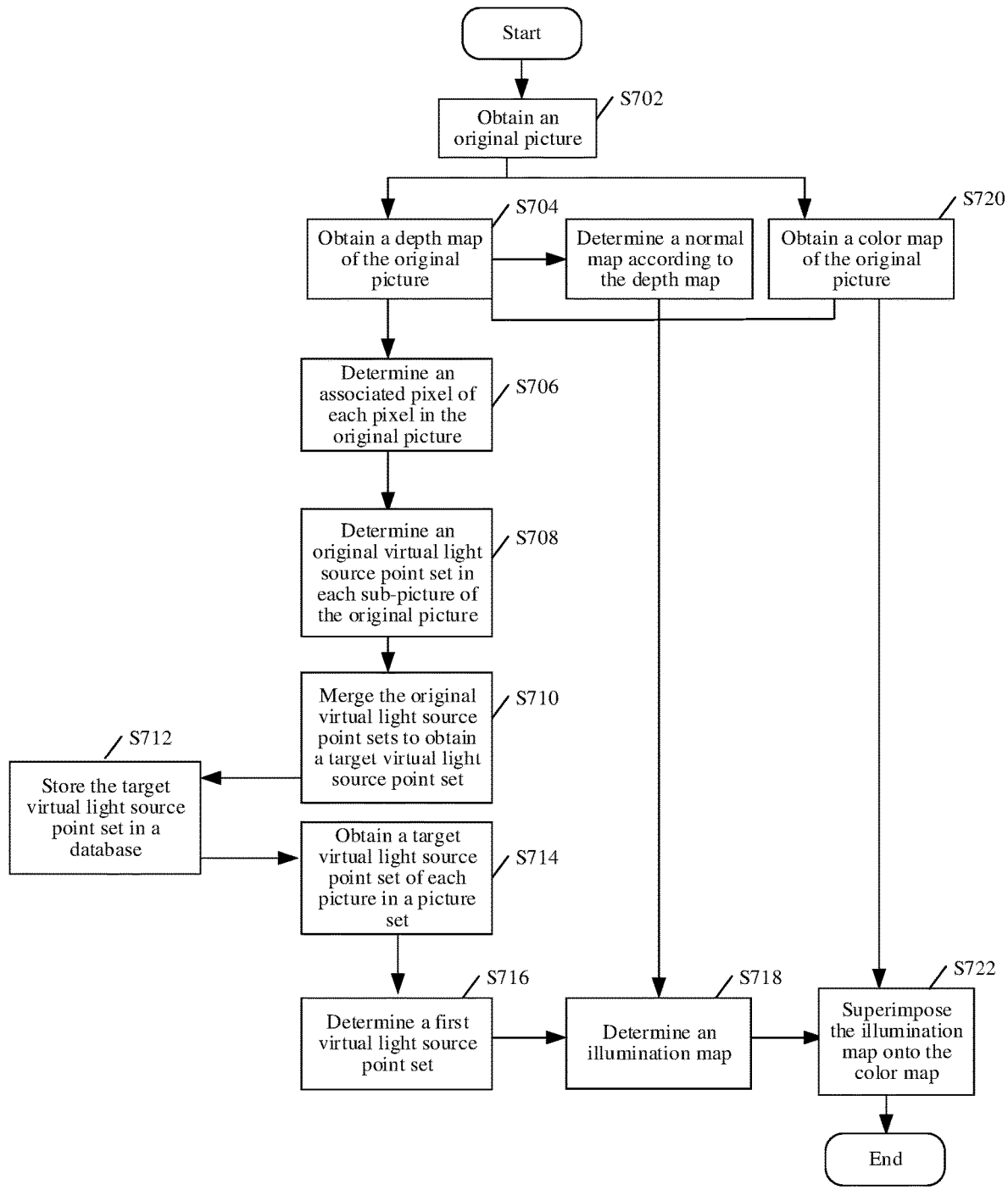
FIG. 7 is a schematic flowchart of another optional illumination rendering method according to an embodiment of this application.

The foregoing illumination rendering method is described below with reference to a game scene. As shown in FIG. 6, FIG. 6 is one display interface of a game. A virtual 3D scene is run in the game. In this solution, a picture is rendered before the picture in the virtual 3D scene is displayed on a client instead of performing real-time illumination rendering on a virtual object, run in the game, in the virtual 3D scene. A to-be-rendered picture is referred to as an original picture in the following, that is, the first picture. Description is made with reference to step S702 to step S722 in FIG. 7.

The following formulas are predefined:
1. abs(x) represents an absolute value of x.
2. p2w(x, y, z) represents a 3D position, in a scene world, to which a point with coordinates (x, y) and a depth of z on a two-dimensional (2D) image corresponds.
3. normalize(x) represents calculating a normalized vector of the vector x.
4. cross(x, y) represents calculating a cross-product vector of the vectors x and Y.
5. depth(x, y) represents a depth distance between a position, a 3D scene, to which a point with coordinates (x, y) on the 2D image corresponds, and an observation position, which can also be referred to as a pixel depth.
6. Indirect(px, py, x, y) represents indirect light illumination on a scene position with the coordinates (x, y) on the 2D image by a scene position with the coordinates (px, py) on the 2D image.
7. length(v) represents calculating a length of the vector v.
8. dot(x, y) represents performing a dot product calculation on the vectors x and y, to obtain a dot product result.

A color map, a depth map, and a normal map of the original picture are obtained after the original picture is obtained. The color map of the original picture records a color value of each pixel of the original picture. The depth map of the original picture records a depth value of each pixel of the original picture. The depth map and the color map may be automatically obtained when a system exports the original picture. The normal map records a normal value of each pixel of the original picture.

In some embodiments, a step of determining the normal map according to the depth map is as follows:

Set a normal value at a pixel position (x, y) as N(x, y), a depth value at the pixel position obtained from the depth map being D(x, y), where D(x, y) is known data.

Set that c=D(x, y), L=D(x−1, y), r=D(x+1, y), u=D(x, y+1), and d=D(x, y−1).

If abs(c−L)<abs(c−r), minLr=abs(c−L); otherwise, minLr=abs(c−r).

If abs(c−u)<abs(c−d), minud=abs(c−u); otherwise, minud=abs(c−d).

Set that Mid=p2w(x, y, c),
Right=p2w(x+1, y, c+minLr)−Mid, and
Top=p2w(x, y+1, c+minud)—Mid,
N(x, y)=normalize(cross(Right, Top)),
where c, L, r, u, d, minLr, minud, Mid, Right, and Top are defined variables, and are used for interpreting a calculation process.

The normal map of the original picture is obtained by using the foregoing method. The normal map and the color map of the original picture are standby.

After the original picture is obtained, a target virtual light source point set of the original picture needs to be determined. A step includes the following operations:

An associated pixel of each pixel in the original picture is calculated. It is specified that coordinates of a pixel in the original picture are (x, y), calculation is performed by using a resolution with a width of N1*W and a height of N2*H (N1 and N2 are generally less than 1, to improve a calculation efficiency of this process). It is set that a position of an associated pixel of the point (x, y) is (Uvpl(x, y), Vvpl(x, y)), W is a width of the original picture, and H is a height of the original picture. A method for calculating the associated pixel is as follows:

1. First, a depth value depth(x, y) of the pixel (x, y) is calculated. If depth(x, y)>G, following steps 2 to 4 are skipped, and it is set that (Uvpl(x, y), Vvpl(x, y))=(0, 0); otherwise, the following steps are performed. G is a predetermined control parameter.

2. Traversal is performed for each pixel (px, py) in the four directions, namely, the positive x direction, the negative x direction, the positive y direction, and the negative y direction, to perform to following operations.

3. If the depth value depth(px, py) of the pixel is less than the depth value depth(x, y) of the pixel (x, y), it is considered that the pixel (px, py) is a pixel closer to the observation position than the pixel (x, y), or (px, py) is a point that can generate indirect illumination on (x, y) at the current observation position (at the target viewing angle). Moreover, (px, py) is set as a second pixel of the pixel (x, y) in this direction, and the traversal in this direction stops; otherwise, a next pixel in the given direction is continuously traversed. However, a maximum quantity of pixels traversed does not exceed a predetermined quantity.

4. A largest second pixel (Pmaxx, Pmaxy) in the four directions is found, and it is set that (Uvpl(x, y), Vvpl(x, y))=(Pmaxx, Pmaxy). If no second pixel is found in the four directions, it is set that (Uvpl(x, y), Vvpl(x, y))=(0, 0).

The associated pixel of each pixel in the original picture may be obtained through the foregoing steps 1 to 4.

Figure 8:
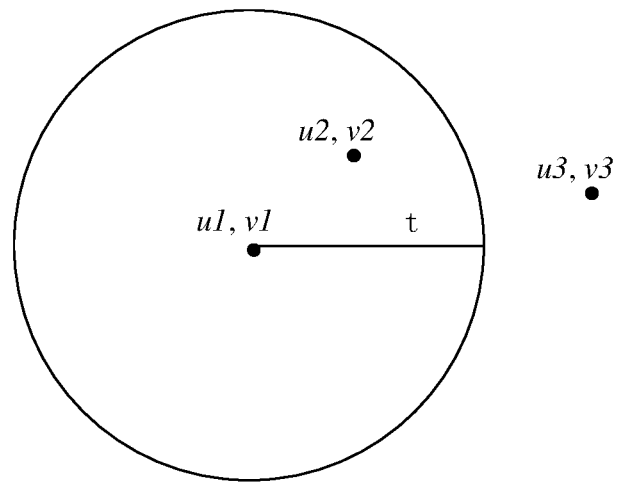
FIG. 8 is a schematic diagram of still another optional illumination rendering method according to an embodiment of this application.

After the associated pixel of each pixel in the original picture is obtained, the original picture is uniformly divided into sub-pictures each with a length of Gw and a width of Gh. That is, each sub-picture includes (W/Gw, H/Gh) pixels. W and H are a length and a width of the original picture, and Gw and Gh are integers greater than 1. For each sub-picture, positions of the associated pixels found in the previous step for all the pixels in the sub-picture are traversed, to obtain a set of positions of associated pixels S, M positions that appear most frequently in S are obtained through statistics to obtain an original virtual light source point set Sn, and the positions of the associated pixels included in Sn are set as the most important indirect light sources affecting the sub-picture. When performing statistics on S to obtain indirect light source positions that appear most frequently, a second threshold t needs to be added, so that two positions (u1, v1) and (u2, v2) spaced apart by a distance t in a 2D are considered as a same position (u1, v1). As shown in FIG. 8, when the first position (u1, v1) is obtained through statistics in FIG. 8, a circle with (u1, v1) as an origin and t as a radius is set as an associated region of (u1, v1). During statistics, when another point, for example, (u2, v2) located within the associated region of (u1, v1) is found, a number of times of counting (u1, v1) is added by 1 rather than use (u2, v2) as a new point for statistics. However, in another example, (u3, v3), which is located outside the associated region of (u1, v1), (u3, v3) is used as a new point for statistics. If a point is located within a common associated region of both points (u1, v1) and (u3, v3), a number of times of counting (u1, v1) is increased when the point is closer to (u1, v1) than (u3, v3), and a number of times of counting (u3, v3) is increased when the point is closer to (u3, v3). Finally, all the Sn's of all the sub-pictures of the original picture are merged into a target virtual light source point set Sf including no repeated elements.

After the target virtual light source point set is determined, the original picture may be rendered by using the target virtual light source point set. To ensure that the rendering process is more stable, in this embodiment, the target virtual light source point set is processed, to obtain a first virtual light source point set, and the original picture is rendered by using the first virtual light source point set. A process of determining the first virtual light source point set includes the following operations.

Sf is added to a database Data, and then calculation is performed based on historical information in the database and Sf to obtain Sf'. It is considered that Sf' may produce a temporally smoother indirect illumination value than Sf. A method of calculating Sf' is: obtaining a target virtual light source point set S={Sf, Sf–1, Sf–2, . . . Sf–h+1} of each frame in previous h frames from the database Data, where h is an integer greater than 1.

Weights of all the previous frames are made as a set W={Wf, Wf–1, Wf–2, . . . Wf–h+1}, Sum(x, y) is a sum of weights of light sources at the coordinates (x, y), each indirect light source E in {Sf, Sf–1, Sf–2, Sf–h+1} is traversed, to obtain a coordinate position (Xe, Ye) of E and a frame number i of E, and Sum(Xe, Ye) is increased by a weight value W(i) in the weight set W corresponding to the $i^{th}$ frame each time an indirect light source is traversed. Finally, the Sum's of all the coordinate positions are sorted in descending order based on the weights, and first K coordinate positions are obtained to form a second virtual light source point set Sf'' of the original picture.

Assuming that the first virtual light source point set of the processed picture in a previous frame of the original picture is Sf–1', and one-to-one mapping is performed on each element position in Sf'' and Sf–1'. This mapping ensures a minimum sum of distances between each element and a mapped element in Sf'' and Sf–1'. Assuming that a $k^{th}$ element in Sf'' is Pk, and an element mapped in Sf–1' is Pk_match, all mapped element pairs (Pk, Pk_match) are sorted in ascending order based on 2D distances between the element pairs, to find first n element pairs (n is a configurable constant) with the smallest distances, and n elements in Sf'' are replaced with mapped element corresponding to Sf–1' to obtain a new set, that is, the first virtual light source point set Sf of the original picture.

After the first virtual light source point set of the original picture is obtained, illumination rendering is performed on the original picture by using the first virtual light source point set.

During illumination rendering, indirect illumination is performed on a current image by using the first virtual light source point set Sf'. For any one of first virtual light source points L in the set Sf', a corresponding color Lc, a position Lw in the virtual 3D scene, and a normal Ln may be found from the color map, the depth map, and the normal map of known image information. For each pixel p of the original picture, a corresponding color pc, a position pw in the virtual 3D scene, a normal pn may be alternatively found from the known color map, depth map, and normal map. An attenuation coefficient of a point source is set to c, and if depth (p)<=a third threshold, indirect illumination is performed on each pixel p in the image based on known information by using L and by using a given illumination model M1, to obtain an illumination result pi through calculation. An illumination model formula that is applicable is as follows:

$$Pi=Lc*dot(Ln, normalize(pw-lw))*dot(pn, normalize(lw-pw))/(c*length(pw-lw)).$$

Indirect illumination results of all the indirect light sources in Sf' on the pixel p are added to obtain an illumination result pi_sum, to finally obtain an illumination map of the original picture, and the illumination map is superimposed onto the color map of the original picture, to obtain a new rendered composite map. Then, in the game scene shown in FIG. 6, the rendered composite map is displayed on the client, to render the virtual 3D scene of the game.

In this embodiment, when a first illumination value of a virtual light source point in the target virtual light source point set on a pixel in the original picture is calculated, the target virtual light source point may further be moved by a distance along an extension line of the pixel and the target virtual light source point, and the attenuation coefficient c of an illumination radiance of the point light source is decreased, so that the illumination effect of an area light source may be simulated by using the point light source, and the illumination quantity is improved.

In this embodiment, the first picture at the target viewing angle is obtained from the virtual 3D scene, the target virtual light source point set of the virtual object in the first picture is determined, and illumination rendering is performed on the virtual object in the first picture by using the target virtual light source point set. Therefore, illumination rendering needs to be performed on only the first picture instead of performing real-time rendering on the virtual object in the virtual 3D scene, thereby reducing the calculation amount during rendering, and improving the efficiency of rendering the virtual 3D scene.

In one implementation, the determining a target virtual light source point set that performs illumination rendering on the first picture includes the following steps:

S1. Determine an original virtual light source point set of each sub-picture in the first picture, the first picture including a plurality of sub-pictures.

S2. Merge the original virtual light source point sets of all the sub-pictures to obtain the target virtual light source point set, the target virtual light source point set including no repeated light source points.

In some embodiments, after the first picture is obtained, the first picture is divided into a plurality of sub-pictures, and the original virtual light source point sets of all the sub-pictures are calculated. As shown in FIG. 3, the original picture 302 is divided into the plurality of sub-pictures 304, the original virtual light source point sets of all the sub-pictures 304 are calculated, and the original virtual light source point sets of all the sub-pictures are merged to obtain the target virtual light source point set.

In this embodiment, the first picture is divided into the plurality of sub-pictures, and the original virtual light source point sets of all the sub-pictures are then calculated, and are merged to obtain the target virtual light source point set. Therefore, the target virtual light source points of the target virtual light source point set are relatively dispersed, and are not concentrated in a relatively small region of the original picture, thereby improving the accuracy of determining the target virtual light source points.

In one implementation, the determining an original virtual light source point set of each sub-picture in the first picture includes the following steps:

S1. Determine, for each sub-picture in the first picture, an associated pixel of each pixel in the sub-picture, to obtain an associated pixel set of the sub-picture.

S2. Determine first M pixels that appear most frequently in the associated pixel set as the original virtual light source point set of the sub-picture, M being an integer greater than zero.

In some embodiments, when the associated pixel of each pixel is determined, if a depth value of a current pixel is greater than a limit value, an associated pixel of the current pixel needs to be determined as (0, 0). If the depth value of the current pixel is less than or equal to the limit value, pixels in the four directions, namely, up, down, left, and right, of the current pixel may be traversed, to determine the associated pixel of the current pixel.

In this embodiment, when the associated pixel set of the sub-picture is determined, several pixels that appear most frequently in the associated pixels of the pixels in the sub-picture are determined as the original virtual light source point set, thereby resolving the problem of a large calculation amount caused by a large quantity of light source points that need to be calculated. In addition, because the several pixels that appear most frequently and are selected by using the foregoing method are of high importance, the accuracy of determining the target virtual light source points is also ensured.

In this embodiment of this application, the associated pixel set of the sub-picture may be determined by using a plurality of methods. In one implementation, the determining an associated pixel of each pixel in the sub-picture, to obtain an associated pixel set of the sub-picture includes the following steps:

S1. Separately determine each pixel in the sub-picture as a first pixel, and perform the following operations: separately determining, in each of four directions, namely, up, down, left, and right, of the first pixel, a pixel that is closest to the first pixel and has a depth value greater than a depth value of the first pixel as a second pixel, and determining a second pixel with a minimum depth value as an associated pixel of the first pixel.

S2. Merge the associated pixels of all the pixels in each sub-picture into the associated pixel set of the sub-picture, the associated pixel set including repeated pixels.

For example, when determining an associated pixel of each pixel, the pixels in the four directions, namely, up, down, left, and right, of the pixel need to be traversed, and a pixel with a depth value less than the depth value of the pixel is first traversed and determined as the second pixel of the pixel.

In this embodiment, a quantity of second pixels of a pixel may be zero to four. If the quantity of second pixels is zero, an associated pixel of the pixel is set to (0, 0).

In this embodiment, the associated pixel of each pixel is traversed by using the foregoing method, so that an associated pixel that meets a condition can be traversed in a relatively short period of time without traversing all the pixels, thereby improving the efficiency of obtaining the associated pixel of each pixel.

In one implementation, the determining a target virtual light source point set that performs illumination rendering on the first picture includes the following steps:

S1. Determine an original virtual light source point set of each sub-picture in the first picture when a difference between a time at which the first picture is obtained and a time at which a $(J-1)^{th}$ processed picture is obtained is greater than or equal to a first threshold, the first picture including a plurality of sub-pictures, the first picture being a $J^{th}$ picture in a picture set, and J being an integer greater than 1.

S2. Merge the original virtual light source point sets of all the sub-pictures to obtain the target virtual light source point set, the target virtual light source point set including no repeated light source points.

In some embodiments, a first threshold is predetermined. The first threshold is used for controlling whether a target virtual light source point of the first picture is calculated. For example, there are ten to-be-rendered pictures, with an interval of 0.04 s between the pictures and the first threshold being 0.2 s are used as an example, and if a target virtual light source point of a first picture among the ten to-be-rendered pictures is obtained through calculation, the target virtual light source point of the first picture is assigned to the first to fifth pictures. Then, a target virtual light source point of a sixth picture is calculated, and the target virtual light source point of the sixth picture is assigned to the sixth to tenth pictures. That is, calculation is performed once every 0.2 s, instead of performing calculation on each picture.

In this embodiment, by setting the first threshold, the target virtual light source point is calculated once every first threshold, thereby reducing the frequency of calculating the target virtual light source point, and improving the efficiency of determining the target virtual light source point.

In one implementation, the determining a target virtual light source point set that performs illumination rendering on the first picture further includes the following step:

S1. Use a target virtual light source point set of the $(J-1)^{th}$ processed picture as the target virtual light source point set of the first picture when the difference between the time at which the first picture is obtained and the time at which the $(J-1)^{th}$ processed picture is obtained is less than the first threshold, the first picture being the $J^{th}$ picture in the picture set, and J being an integer greater than 1.

In this embodiment, by setting the first threshold, when a time interval between the first picture and a previous picture is less than the first threshold, a target virtual light source point of the previous picture is directly assigned to the first picture, thereby improving the efficiency of determining the target virtual light source point.

In one implementation, the performing illumination rendering on the first picture by using the target virtual light source point set includes the following steps:

S1. Obtain a result of illuminating each pixel in the first picture by using the target virtual light source point set, to obtain an illumination map of the first picture, the illumination map recording an illumination value of each pixel in the first picture.

S2. Superimpose the illumination map onto a color map of the first picture, to obtain a rendered first picture.

In some embodiments, after the target virtual light source point set is obtained, the illumination result of each pixel in the first picture is determined by using the target virtual light source point set, to obtain the illumination map of the first picture, and the illumination map is combined with the color map, to determine the rendered first picture. When the illumination map is combined with the color map, the illumination map undergone transparency adjustment may be superimposed onto the color map, or the illumination map is directly superimposed onto the color map.

In this embodiment, the illumination map is superimposed onto the color map, so that the first picture may be directly processed to implement illumination rendering on the virtual object in the virtual 3D scene, thereby improving the efficiency of illumination rendering.

In one implementation, the obtaining a result of illuminating each pixel in the first picture by using the target virtual light source point set includes the following steps:

S1. Use each pixel in the first picture as a third pixel, and perform the following operations until an illumination result for each pixel in the first picture is determined.

S2. Determine a first illumination value of each virtual light source point in the target virtual light source point set on the third pixel.

S3. Add the first illumination values of all the virtual light source points in the target virtual light source point set on the third pixel, to obtain the illumination result.

In this embodiment, a first illumination value of each target virtual light source point in the target virtual light source point set on a pixel is determined, and the first illumination values are added to obtain the illumination result, thereby improving the efficiency of obtaining the illumination map of the first picture.

In one implementation, a manner of performing illumination rendering on the virtual object in the first picture by using the target virtual light source point set may be: S1. obtaining a target virtual light source point set of each processed picture before the first picture in a picture set; determining a second virtual light source point set of the first picture according to the target virtual light source point set of each picture in the picture set, the first picture being a last picture in the picture set; replacing N pixels in the second virtual light source point set of the first picture with N pixels in a first virtual light source point set of a processed picture in a previous frame of the first picture, and determining the second virtual light source point set that has undergone replacement as a first virtual light source point set of the first picture; and performing illumination rendering on the virtual object in the first picture by using the first virtual light source point set of the first picture.

In some embodiments, after the target virtual light source point set is obtained, the first picture is not processed by using the target virtual light source point set. Instead, the first virtual light source point set of the first picture is calculated according to the target virtual light source point set of each picture in the picture set, and the first picture is processed by using the first virtual light source point set obtained through calculation.

In some embodiments, the first virtual light source point set of the first picture is determined according to the target virtual light source point set of each picture in the picture set, and illumination rendering is performed on the first picture according to the first virtual light source point set, thereby avoiding flickering during rendering.

In one implementation, the determining a second virtual light source point set of the first picture according to the target virtual light source point set of each picture in the picture set includes:

S1. Obtain a weight value predetermined for each processed picture in the picture set.

S2. Obtain, for each pixel in the target virtual light source point set of the first picture, a weight of a processed picture of which the target virtual light source point set includes the pixel.

S3. Obtain a sum of weights, to obtain a weight sum of each pixel in the target virtual light source point set of the first picture.

S4. Use first K pixels with largest weight sums in the target virtual light source point set of the first picture as the second virtual light source point set of the first picture, K being an integer greater than zero.

For example, there being three processed pictures before the first picture is used as an example. A processing sequence is a processed picture 1, a processed picture 2, and a processed picture 3. Weights are 0.1, 0.3, and 0.6 respectively. For a pixel in the target virtual light source point set of the first picture, a target virtual light source point set of each of the processed pictures 1 to 3 are traversed. If the pixel is traversed, for example, the pixel is found in the target virtual light source point set of the processed picture 1, the weight 0.1 of the processed picture 1 is obtained. If the pixel is found in the target virtual light source point set of the processed picture 3, the weight 0.6 of the processed picture 3 is obtained. A sum of weights obtained through calculation is 0.7. By using the method, the sum of weights of each pixel in the target virtual light source point set of the first picture is determined, sorting is performed, and several pixels with largest weight sums are determined as the second virtual light source point set. However, the first virtual light source point set of the first picture is determined according to a first virtual light source point set of the previous picture of the first picture and the second virtual light source point set of the first picture.

In some embodiments, the first virtual light source point set is determined by using the foregoing method, thereby ensuring the accuracy of determining the first virtual light source point set.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all example embodiments, and the involved actions and modules are not necessarily required by this application.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 9:
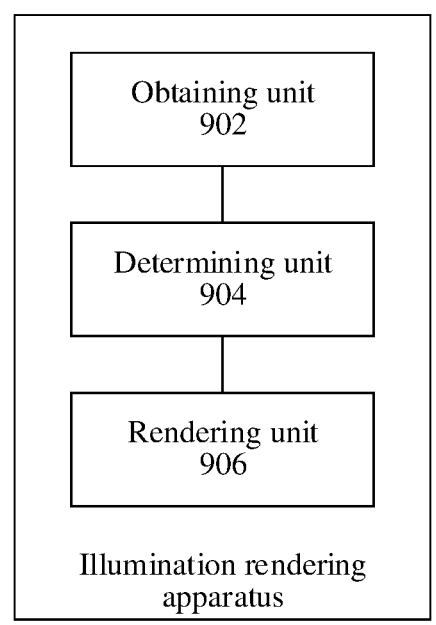
FIG. 9 is a schematic structural diagram of one illumination rendering apparatus according to an embodiment of this application.

According to another example of the embodiments of this application, an illumination rendering apparatus for implementing the foregoing illumination rendering method is further provided. As shown in FIG. 9, the apparatus includes:

(1) an obtaining unit 902, configured to obtain a first picture at a target viewing angle from a virtual 3D scene, the first picture including a virtual object to be subject to illumination rendering in the virtual 3D scene at the target viewing angle;

(2) a determining unit 904, configured to determine a target virtual light source point set that performs illumination rendering on the virtual object in the first picture; and (3) a rendering unit 906, configured to perform illumination rendering on the virtual object in the first picture by using the target virtual light source point set.

In some embodiments, the foregoing illumination rendering method is applicable to, but not limited to, a process of performing illumination rendering on the virtual 3D scene, for example, a process of performing illumination rendering on a virtual 3D scene in a game, performing illumination rendering on a virtual 3D scene in virtual training, or performing rendering on a virtual 3D scene in virtual shopping.

Description is made by using an example in which illumination rendering is performed on a virtual 3D scene in a game. During the game, the virtual 3D scene is run in the game. The virtual 3D scene includes a virtual object to be subject to global illumination rendering. In the related art, a real-time calculation generally needs to be performed based on illumination effect on the virtual object in the virtual 3D scene by a virtual light source in the virtual 3D scene, to obtain a calculation result, and global illumination rendering is performed on the virtual object. However, the foregoing method has a large calculation amount, and has a low efficiency in global illumination rendering on the virtual 3D scene. In this embodiment, the first picture at the target viewing angle is obtained from the virtual 3D scene, the target virtual light source point set that performs illumination rendering on the virtual object in the first picture is determined, and illumination rendering is performed on the virtual object in the first picture by using the target virtual light source point set, to perform illumination rendering on only the first picture instead of performing real-time rendering on the virtual 3D scene, thereby reducing the calculation amount during rendering, and improving the efficiency of rendering the virtual 3D scene.

In one implementation, the determining unit includes:
(1) a first determining module, configured to determine an original virtual light source point set of each sub-picture in the first picture, the first picture including a plurality of sub-pictures; and
(2) a first merging module, configured to merge the original virtual light source point sets of all the sub-pictures to obtain the target virtual light source point set, the target virtual light source point set including no repeated light source points.

In this embodiment, the original picture is divided into the plurality of sub-pictures, and the original virtual light source point sets of all the sub-pictures are then calculated, and are merged to obtain the target virtual light source point set. Therefore, the target virtual light source points of the target virtual light source point set are relatively dispersed, and are not concentrated in a relatively small region of the original picture, thereby improving the accuracy of determining the target virtual light source points.

In one implementation, the first determining module includes:
(1) a first determining submodule, configured to determine, for each sub-picture in the first picture, an associated pixel of each pixel in the sub-picture, to obtain an associated pixel set of the sub-picture; and
(2) a second determining submodule, configured to determine first M pixels that appear most frequently in the associated pixel set as the original virtual light source point set of the sub-picture, M being an integer greater than zero.

In this embodiment, when the associated pixel set of the sub-picture is determined, several pixels that appear most frequently in the associated pixels of the pixels in the sub-picture are determined as the original virtual light source point set, thereby resolving the problem of a large calculation amount caused by a large quantity of light source points that need to be calculated. In addition, because the several pixels that appear most frequently and are selected by using the foregoing method are of high importance, the accuracy of determining the target virtual light source points is also ensured.

In one implementation, the first determining submodule is further configured to perform the following steps:
(1) Separately determine each pixel in the sub-picture as a first pixel, and perform the following operations: separately determining, in each of four directions, namely, up, down, left, and right, of the first pixel, a pixel that is closest to the first pixel and has a depth value greater than a depth value of the first pixel as a second pixel, and determining a second pixel with a minimum depth value as an associated pixel of the first pixel.

(2) Merge the associated pixels of all the pixels in the sub-picture into the associated pixel set of the sub-picture, the associated pixel set including repeated pixels.

In this embodiment, the associated pixel of each pixel is traversed by using the foregoing method, so that an associated pixel that meets a condition can be traversed in a relatively short period of time without traversing all the pixels, thereby improving the efficiency of obtaining the associated pixel of each pixel.

In one implementation, the determining unit includes:
(1) a second determining module, configured to determine an original virtual light source point set of each sub-picture in the first picture when a difference between a time at which the first picture is obtained and a time at which a $(J-1)^{th}$ processed picture is obtained is greater than or equal to a first threshold, the first picture including a plurality of sub-pictures, the first picture being a $J^{th}$ picture in a picture set, and J being an integer greater than 1; and
(2) a second merging module, configured to merge the original virtual light source point sets of all the sub-pictures to obtain the target virtual light source point set of the first picture, the target virtual light source point set including no repeated light source points.

In this embodiment, by setting the first threshold, the target virtual light source point is calculated once every first threshold, thereby reducing the frequency of calculating the target virtual light source point, and improving the efficiency of determining the target virtual light source point.

In one implementation, the determining unit further includes:
(1) a third determining module, configured to use a target virtual light source point set of the $(J-1)^{th}$ processed picture as the target virtual light source point set of the first picture when the difference between the time at which the first picture is obtained and the time at which the $(J-1)^{th}$ processed picture is obtained is less than the first threshold, the first picture being the $J^{th}$ picture in the picture set, and J being an integer greater than 1.

In this embodiment, by setting the first threshold, when a time interval between the first picture and a previous picture is less than the first threshold, a target virtual light source point of the previous picture is directly assigned to the first picture, thereby improving the efficiency of determining the target virtual light source point.

In one implementation, the rendering unit includes:
(1) a first obtaining module, configured to obtain a result of illuminating each pixel in the first picture by using the target virtual light source point set, to obtain an illumination map of the first picture, the illumination map recording an illumination value of each pixel in the first picture; and
(2) a superimposing module, configured to superimpose the illumination map onto a color map of the first picture, to obtain a rendered first picture.

In this embodiment, the illumination map is superimposed onto the color map, so that the first picture may be directly processed to implement illumination rendering on the virtual object in the virtual 3D scene, thereby improving the efficiency of illumination rendering.

The obtaining module includes:
(1) an execution submodule, configured to: use each pixel in the first picture as a third pixel, and perform the following operations until an illumination result for each pixel in the first picture is determined:

(2) determining a first illumination value of each virtual light source point in the target virtual light source point set on the third pixel; and (3) adding the first illumination values of all the virtual light source points in the target virtual light source point set on the third pixel, to obtain the illumination result.

In this embodiment, a first illumination value of each target virtual light source point in the target virtual light source point set on a pixel is determined, and the first illumination values are added to obtain the illumination result, thereby improving the efficiency of obtaining the illumination map of the first picture.

In one implementation, the rendering unit is configured to: obtain a target virtual light source point set of each processed picture before the first picture in a picture set; determine a second virtual light source point set of the first picture according to the target virtual light source point set of each picture in the picture set, the first picture being a last picture in the picture set; replace N pixels in the second virtual light source point set of the first picture with N pixels in a first virtual light source point set of a processed picture in a previous frame of the first picture, and determine the second virtual light source point set that has undergone replacement as a first virtual light source point set of the first picture; and perform illumination rendering on the virtual object in the first picture by using the first virtual light source point set of the first picture.

In this embodiment, the first virtual light source point set of the first picture is determined according to the target virtual light source point set of each picture in the picture set, and illumination rendering is performed on the first picture according to the first virtual light source point set, thereby avoiding flickering during rendering.

In one implementation, the rendering unit further includes:

(1) a second obtaining module, configured to obtain a weight value predetermined for each processed picture in the picture set;

(2) a third obtaining module, configured to obtain, for each pixel in the target virtual light source point set of the first picture, a weight of a processed picture of which the target virtual light source point set includes the pixel;

(3) a fourth obtaining module, configured to obtain a sum of weights, to obtain a weight sum of each pixel in the first picture; and (4) a fourth determining module, configured to use first K pixels with largest weight sums in the first picture as the second virtual light source point set of the first picture, K being an integer greater than zero.

In this embodiment, the first virtual light source point set is determined by using the foregoing method, thereby ensuring the accuracy of determining the first virtual light source point set.

Figure 10:
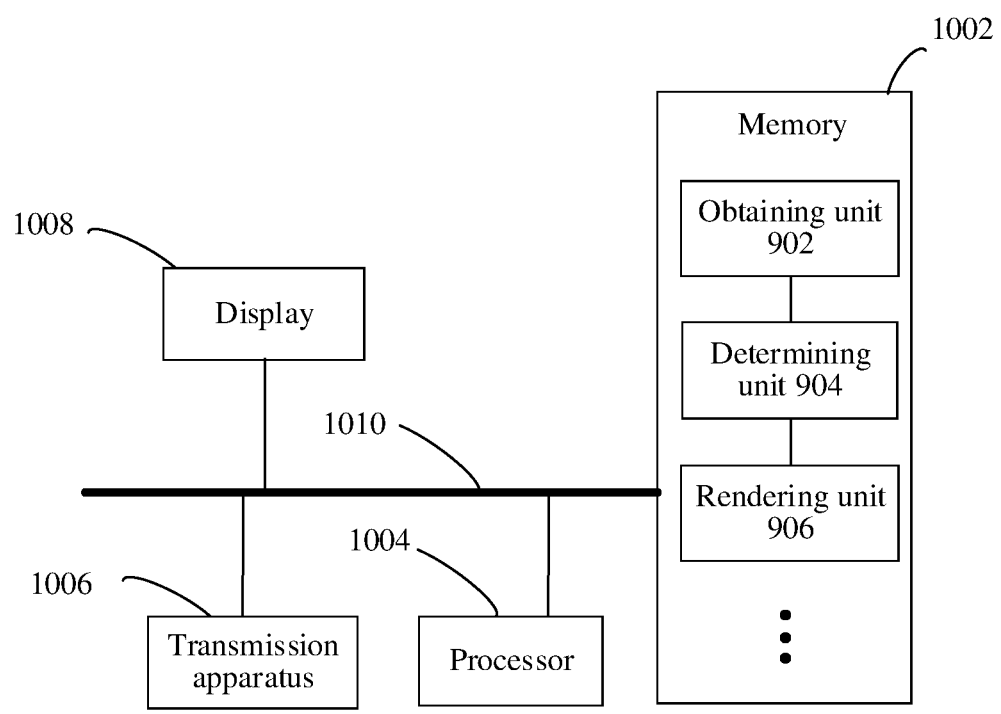
FIG. 10 is a schematic structural diagram of one electronic device according to an embodiment of this application.

According to yet another example of the embodiments of this application, an electronic device for implementing the foregoing illumination rendering method is further provided. As shown in FIG. 10, the electronic device includes a memory 1002 and a processor 1004. The memory 1002 stores a computer program, and the processor 1004 is configured to perform the steps in any one of the foregoing method embodiments through the computer program.

In some embodiments, the electronic device may be located in at least one of a plurality of network devices in a computer network.

In some embodiments, the processor may be configured to perform the following steps by using the computer program:

S1. Obtain a first picture at a target viewing angle from a virtual 3D scene, the first picture including a virtual object to be subject to illumination rendering in the virtual 3D scene at the target viewing angle.

S2. Determine a target virtual light source point set that performs illumination rendering on the virtual object in the first picture.

S3. Perform illumination rendering on the virtual object in the first picture by using the target virtual light source point set.

In some embodiments, a person of ordinary skill in the art may understand that, the structure shown in FIG. 10 is only schematic. The electronic device may be a terminal device such as a smartphone (such as an Android mobile phone or an iOS mobile phone), a tablet computer, a palmtop computer, a mobile Internet device (MID), or a PAD. FIG. 10 is merely one example and does not constitute a limitation on the structure of the foregoing electronic device. For example, the electronic device may further include more or fewer components (such as a network interface) than those shown in FIG. 10, or have a configuration different from that shown in FIG. 10.

The memory 1002 may be configured to store a software program and a module, for example, a program instruction/module corresponding to the illumination rendering method and apparatus in the embodiments of this application, and the processor 1004 performs various functional applications and data processing by running a software program and a module stored in the memory 1002, that is, implementing the foregoing illumination rendering method. The memory 1002 may include a high-speed random access memory, and may also include a non-volatile memory, for example, one or more magnetic storage apparatuses, a flash memory, or another non-volatile solid-state memory. In some embodiments, the memory 1002 may further include memories remotely disposed relative to the processor 1004, and the remote memories may be connected to a terminal through a network. Examples of the network include, but are not limited to, the Internet, an intranet, a local area network, a mobile communications network and a combination thereof. The memory 1002 may be configured to store, but are not limited to, information such as the first picture and the target virtual light source point set. In an example, as shown in FIG. 10, the memory 1002 may include, but are not limited to, the obtaining unit 902, the determining unit 904, and the rendering unit 906 in the foregoing illumination rendering apparatus. In addition, the memory may further include, but are not limited to, other modules and units in the foregoing illumination rendering apparatus.

In some embodiments, a transmission apparatus 1006 is configured to receive or transmit data via a network. Other examples of the foregoing network may include a wired network and a wireless network. In an example, the transmission apparatus 1006 includes a network interface controller (NIC). The NIC may be connected to another network device and a router via a network cable, to communicate with the Internet or a local area network. In an example, the transmission apparatus 1006 is a radio frequency (RF) module, which communicates with the Internet in a wireless manner.

In addition, the electronic device further includes: a display 1008, configured to display a first picture after illumination rendering; and a connection bus 1010, configured to connect various module components in the foregoing electronic device.

According to still another example of the embodiments of this application, a storage medium is further provided, the storage medium storing a computer program, the computer program being configured to perform, when run, steps in any one of the foregoing method embodiments.

In some embodiments, the storage medium may be configured to store a computer program for performing the following steps:

S1. Obtain a first picture at a target viewing angle from a virtual 3D scene, the first picture including a virtual object to be subject to illumination rendering in the virtual 3D scene at the target viewing angle.

S2. Determine a target virtual light source point set that performs illumination rendering on the virtual object in the first picture.

S3. Perform illumination rendering on the virtual object in the first picture by using the target virtual light source point set.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like. The sequence numbers of the foregoing embodiments of this application are merely for description purposes, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a PC, a server, a network device, and the like) to perform all or some of the steps of the methods described in the embodiments of this application.

In the foregoing embodiments of this application, descriptions of the embodiments have respective focuses, but can apply to various other examples of different embodiments. For example, the description of parts in one embodiment, may apply to the relevant descriptions of the other embodiments.

In the several embodiments provided in this application, it is to be understood that, the disclosed client may be implemented in another manner. The apparatus embodiments described above are merely examples. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely example implementations of this application. A person of ordinary skill in the art may further make several improvements and modifications without departing from the principle of this application, and the improvements and modifications are also considered as falling within the protection scope of this application.

What is claimed is:

1. An illumination rendering method comprising:
   obtaining a first picture in a picture set at a target viewing angle from a virtual three-dimensional (3D) scene, the first picture comprising a virtual object to be subject to illumination rendering in the virtual 3D scene at the target viewing angle;
   determining a target virtual light source point set that performs illumination rendering on the virtual object in the first picture;
   obtaining a target virtual light source point set of each processed picture before the first picture from the picture set;
   determining a second virtual light source point set of the first picture according to the target virtual light source point set of each picture in the picture set, wherein the first picture being a last picture in the picture set;
   replacing one or more pixels in the second virtual light source point set of the first picture with one or more pixels in a first virtual light source point set of a processed picture in a previous frame of the first picture, such that the second virtual light source point set replaces the first virtual light source point set of the first picture; and
   performing illumination rendering on the virtual object in the first picture by using the first virtual light source point set of the first picture.

2. The method according to claim 1, wherein the determining a second virtual light source point set of the first picture further comprises:
   obtaining a weight value predetermined for each processed picture in the picture set;
   obtaining, for each pixel in the target virtual light source point set of the first picture, a weight of a processed picture of which the target virtual light source point set comprises the pixel;
   obtaining a sum of weights, to obtain a weight sum of each pixel in the target virtual light source point set of the first picture; and
   using first K pixels with largest weight sums in the first picture as the second virtual light source point set of the first picture, wherein K is an integer greater than zero.

3. The method according to claim 1, wherein the determining a target virtual light source point set further comprises:
   determining an original virtual light source point set of each sub-picture in the first picture, the first picture comprising a plurality of sub-pictures; and
   merging the original virtual light source point sets of all the sub-pictures to obtain the target virtual light source point set, the target virtual light source point set comprising no repeated virtual light source points.

4. The method according to claim 3, wherein the determining an original virtual light source point set further comprises:
determining, for each sub-picture in the first picture, an associated pixel of each pixel in the sub-picture, to obtain an associated pixel set of the sub-picture; and
determining first M pixels that appear most frequently in the associated pixel set as the original virtual light source point set of the sub-picture, wherein M is an integer greater than zero.

5. The method according to claim 4, wherein the determining an associated pixel of each pixel in the sub-picture further comprises:
separately determining each pixel in the sub-picture as a first pixel, and performing the following operations:
separately determining, in each of four directions about the first pixel, a pixel that is closest to the first pixel and has a depth value greater than a depth value of the first pixel as a second pixel, and determining a second pixel with a minimum depth value as an associated pixel of the first pixel; and
merging the associated pixels of all the pixels in the sub-picture into the associated pixel set of the sub-picture, the associated pixel set comprising repeated pixels.

6. The method according to claim 1, wherein the determining a target virtual light source point set that performs illumination rendering on the virtual object in the first picture comprises:
determining an original virtual light source point set of each sub-picture in the first picture when a difference between a time at which the first picture is obtained and a time at which a $(J-1)^{th}$ processed picture is obtained is greater than or equal to a first threshold, the first picture comprising a plurality of sub-pictures, the first picture being a $J^{th}$ picture in a picture set, and J being an integer greater than 1; and
merging the original virtual light source point sets of all the sub-pictures to obtain the target virtual light source point set, the target virtual light source point set comprising no repeated virtual light source points.

7. The method according to claim 6, wherein the determining a target virtual light source point set further comprises:
using a target virtual light source point set of the $(J-1)^{th}$ processed picture as the target virtual light source point set of the first picture when the difference between the time at which the first picture is obtained and the time at which the $(J-1)^{th}$ processed picture is obtained is less than the first threshold, the first picture being the $J^{th}$ picture in the picture set, wherein J is an integer greater than 1.

8. The method according to claim 1, wherein the performing illumination rendering on the virtual object in the first picture further comprises:
obtaining a result of illuminating each pixel in the first picture by using the target virtual light source point set;
obtaining an illumination map of the first picture, the illumination map recording an illumination value of each pixel in the first picture; and
superimposing the illumination map onto a color map of the first picture, to obtain a rendered first picture.

9. The method according to claim 8, wherein the obtaining a result of illuminating each pixel in the first picture further comprises:

using each pixel in the first picture as a third pixel, and performing the following operations until an illumination result for each pixel in the first picture is determined:
determining a first illumination value of each virtual light source point in the target virtual light source point set on the third pixel; and
adding the first illumination values of all the virtual light source points in the target virtual light source point set on the third pixel, to obtain the illumination result.

10. An illumination rendering method comprising:
obtaining a first picture at a target viewing angle from a virtual three-dimensional (3D) scene, the first picture comprising a virtual object to be subject to illumination rendering in the virtual 3D scene at the target viewing angle;
determining an original virtual light source point set of each sub-picture in the first picture when a difference between a time at which the first picture is obtained and a time at which a $(J-1)^{th}$ processed picture is obtained is greater than or equal to a first threshold, the first picture comprising a plurality of sub-pictures, the first picture being a $J^{th}$ picture in a picture set, and J being an integer greater than 1;
merging the original virtual light source point sets of the sub-pictures to obtain a target virtual light source point set; and
performing illumination rendering on the virtual object in the first picture by using the target virtual light source point set.

11. The method of claim 10, wherein the target virtual light source point set comprises no repeated virtual light source points.

12. The method of claim 10, further comprising:
using a target virtual light source point set of the $(J-1)^{th}$ processed picture as the target virtual light source point set of the first picture when the difference between the time at which the first picture is obtained and the time at which the $(J-1)^{th}$ processed picture is obtained is less than the first threshold, the first picture being the $J^{th}$ picture in the picture set, wherein J is an integer greater than 1.

13. The method according to claim 10, wherein the performing illumination rendering on the virtual object in the first picture further comprises:
obtaining a result of illuminating each pixel in the first picture by using the target virtual light source point set;
obtaining an illumination map of the first picture, the illumination map recording an illumination value of each pixel in the first picture; and
superimposing the illumination map onto a color map of the first picture, to obtain a rendered first picture.

14. The method according to claim 13, wherein the obtaining a result of illuminating each pixel in the first picture further comprises:
using each pixel in the first picture as a third pixel, and performing the following operations until an illumination result for each pixel in the first picture is determined:
determining a first illumination value of each virtual light source point in the target virtual light source point set on the third pixel; and
adding the first illumination values of all the virtual light source points in the target virtual light source point set on the third pixel, to obtain the illumination result.

15. The method according to claim 10, wherein the performing illumination rendering on the virtual object in the first picture further comprises:
- obtaining a target virtual light source point set of each processed picture before the first picture in a picture set;
- determining a second virtual light source point set of the first picture according to the target virtual light source point set of each picture in the picture set, the first picture being a last picture in the picture set;
- replacing N pixels in the second virtual light source point set of the first picture with N pixels in a first virtual light source point set of a processed picture in a previous frame of the first picture, and determining the second virtual light source point set that has undergone replacement as a first virtual light source point set of the first picture; and
- performing illumination rendering on the virtual object in the first picture by using the first virtual light source point set of the first picture.

16. The method according to claim 15, wherein the determining a second virtual light source point set of the first picture further comprises:
- obtaining a weight value predetermined for each processed picture in the picture set;
- obtaining, for each pixel in the target virtual light source point set of the first picture, a weight of a processed picture of which the target virtual light source point set comprises the pixel;
- obtaining a sum of weights, to obtain a weight sum of each pixel in the target virtual light source point set of the first picture; and
- using first K pixels with largest weight sums in the first picture as the second virtual light source point set of the first picture, wherein K is an integer greater than zero.

17. An illumination rendering apparatus, comprising:
- a non-transitory computer readable medium in communication with a processor and storing a plurality of instructions, the plurality of instructions, when executed by the processor, cause the processor to:
- obtain a first picture at a target viewing angle from a virtual three-dimensional (3D) scene, the first picture comprising a virtual object to be subject to illumination rendering in the virtual 3D scene at the target viewing angle;
- determine a target virtual light source point set that performs illumination rendering on the virtual object in the first picture, wherein the target virtual light source point set is determined by determining an associated pixel set associated with at least two pixels and determining the target virtual light source point according to frequency of pixel in the associated pixel set; and
- perform illumination rendering on the virtual object in the first picture by using the target virtual light source point set.

18. The apparatus according to claim 17, wherein the computer readable instructions further cause the processor to:
- to determine an original virtual light source point set of each sub-picture in the first picture, the first picture comprising a plurality of sub-pictures; and
- merge the original virtual light source point sets of all the sub-pictures to obtain the target virtual light source point set, the target virtual light source point set comprising no repeated virtual light source points.

19. The apparatus according to claim 18, the computer readable instructions further cause the processor to:
- determine, for each sub-picture in the first picture, an associated pixel of each pixel in the sub-picture, to obtain an associated pixel set of the sub-picture; and
- determine first M pixels that appear most frequently in the associated pixel set as the original virtual light source point set of the sub-picture, wherein M is an integer greater than zero.

20. The apparatus according to claim 17, wherein each sub-picture in the first picture has an associated pixel set.

* * * * *